(12) United States Patent
Kurematsu

(10) Patent No.: US 12,055,189 B2
(45) Date of Patent: Aug. 6, 2024

(54) POSITIVE CLUTCH

(71) Applicant: TSUBAKIMOTO CHAIN CO., Osaka (JP)

(72) Inventor: Yuji Kurematsu, Osaka (JP)

(73) Assignee: SUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/219,785

(22) Filed: Jul. 10, 2023

(65) Prior Publication Data

US 2024/0026940 A1 Jan. 25, 2024

(30) Foreign Application Priority Data

Jul. 20, 2022 (JP) .................................. 2022-115477

(51) Int. Cl.
| F16D 41/064 | (2006.01) |
| F16D 23/12 | (2006.01) |
| F16D 41/08 | (2006.01) |

(52) U.S. Cl.
CPC ...... F16D 41/064 (2013.01); *F16D 2023/123* (2013.01); *F16D 2041/0646* (2013.01); *F16D 41/086* (2013.01)

(58) Field of Classification Search
CPC ............... F16D 15/00; F16D 2023/123; F16D 41/08–105; F16D 41/064–067
See application file for complete search history.

(56) References Cited

U.S. PATENT DOCUMENTS

| 1,175,300 | A | * | 3/1916 | Ross | ....................... F16H 48/12 74/650 |
| 4,222,472 | A | * | 9/1980 | Telford | ................... F16D 15/00 192/36 |
| 5,706,700 | A | * | 1/1998 | Takagi | ................. F02N 15/023 188/82.84 |
| 5,779,015 | A | * | 7/1998 | Murata | ................. F16D 41/066 192/42 |
| 5,819,583 | A | * | 10/1998 | Matsushima | ......... F16D 41/064 475/263 |
| 6,012,985 | A | * | 1/2000 | Sukup | ....................... F16D 7/10 464/83 |

(Continued)

FOREIGN PATENT DOCUMENTS

| JP | 2020-133686 A | 8/2020 |
| JP | 2021-120586 A | 8/2021 |

(Continued)

*Primary Examiner* — Ernesto A Suarez
*Assistant Examiner* — James J Taylor, II
(74) *Attorney, Agent, or Firm* — WHDA, LLP

(57) ABSTRACT

An object of the present invention is to provide a positive clutch that has a high rigidity and simple structure, reduces friction loss, prevents noise generation, allows a size reduction, and helps extend a service life. The object is achieved by the following configuration: Roller support parts are formed on one of an outer circumferential surface of the inner race and an inner circumferential surface of the outer race, and pocket parts are formed on the other one of the inner race and outer race. The clutch is configured to stop relative rotation of the inner race and outer race by holding the rollers, which are disposed between the inner race and the outer race, between the roller support parts and pocket parts in the circumferential direction.

4 Claims, 16 Drawing Sheets

(56) References Cited

U.S. PATENT DOCUMENTS

| | | | | |
|---|---|---|---|---|
| 9,856,930 B2* | 1/2018 | Heath | ............ | F16D 41/105 |
| 10,781,868 B2* | 9/2020 | Hunt | ............ | F16D 23/12 |
| 10,808,822 B1* | 10/2020 | Yin | ............ | F16D 41/064 |
| 10,864,813 B2* | 12/2020 | Lahr | ............ | B60K 6/48 |
| 2007/0010366 A1* | 1/2007 | Larin | ............ | F16H 48/19 |
| | | | | 475/249 |

FOREIGN PATENT DOCUMENTS

| | | | |
|---|---|---|---|
| JP | 2021-156426 A | 10/2021 | |
| JP | 2022-38806 A | 3/2022 | |
| WO | WO-2013068110 A1 * | 5/2013 | ............ F16D 7/10 |

* cited by examiner

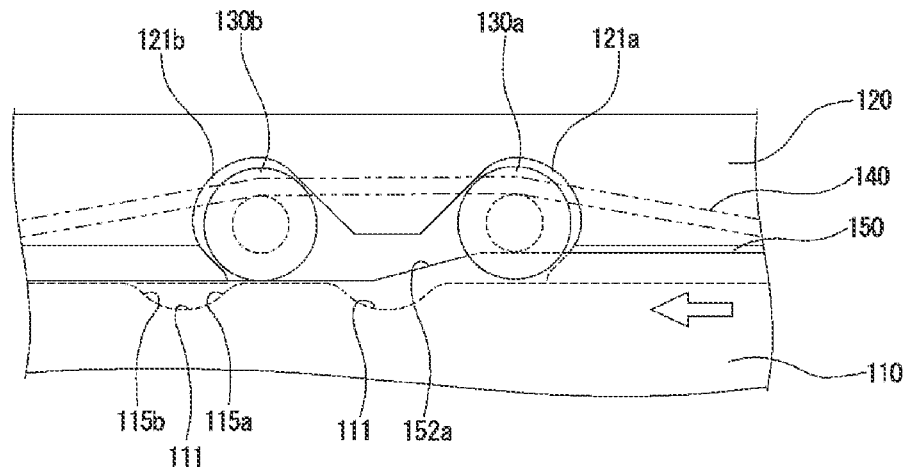
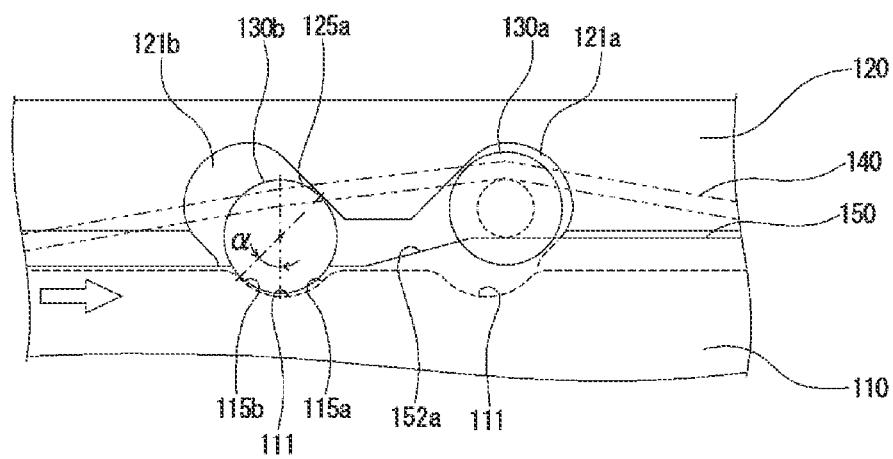
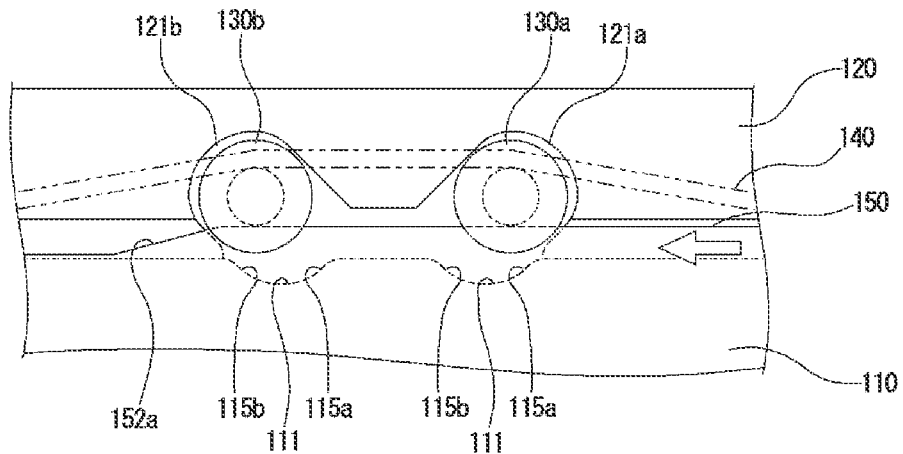

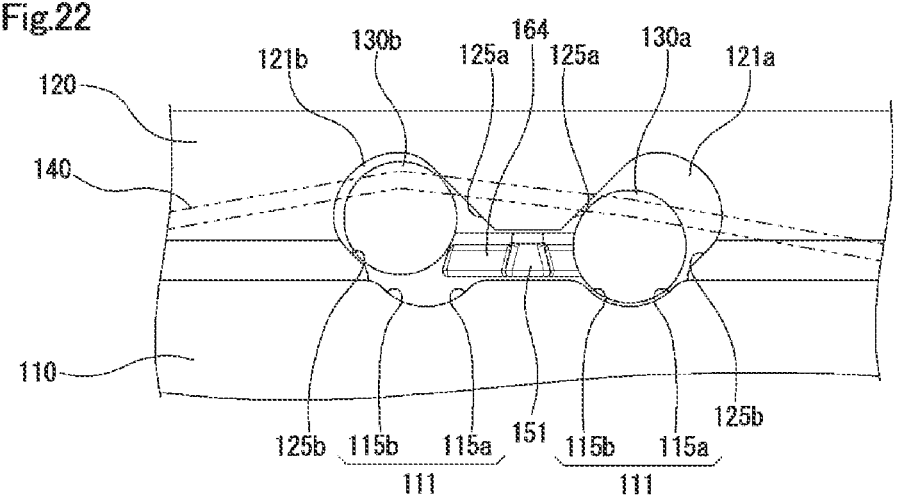
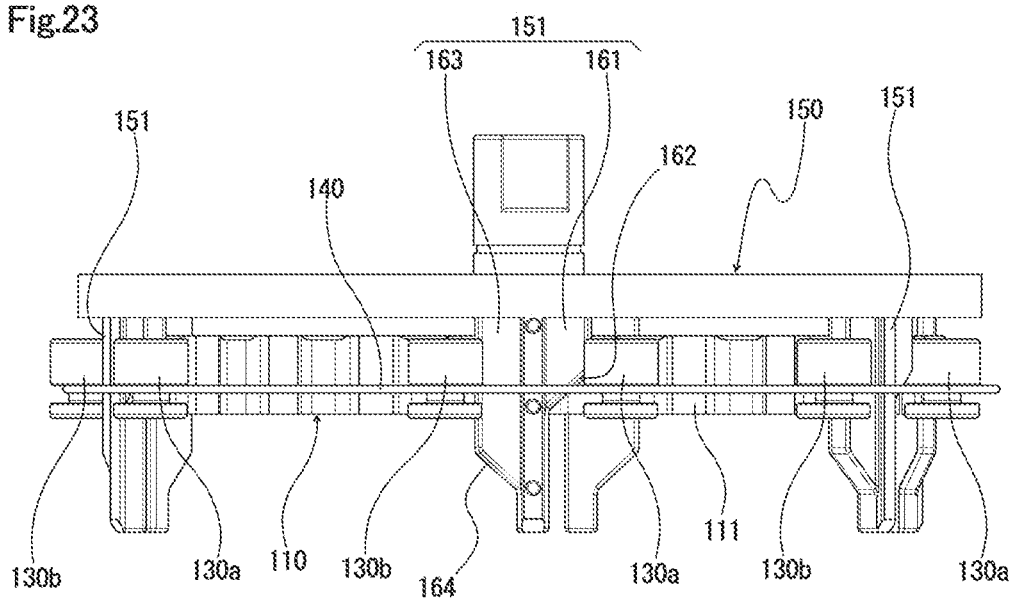

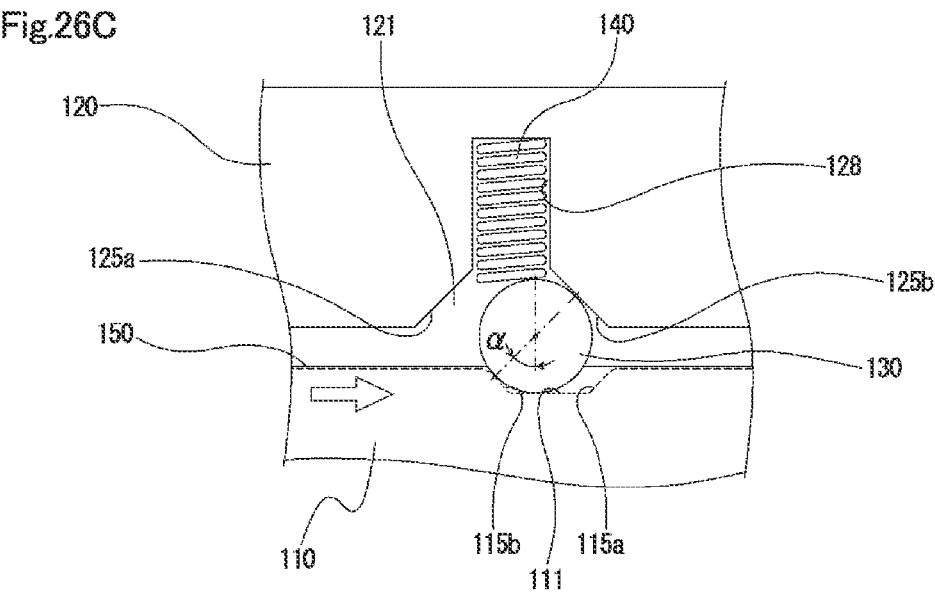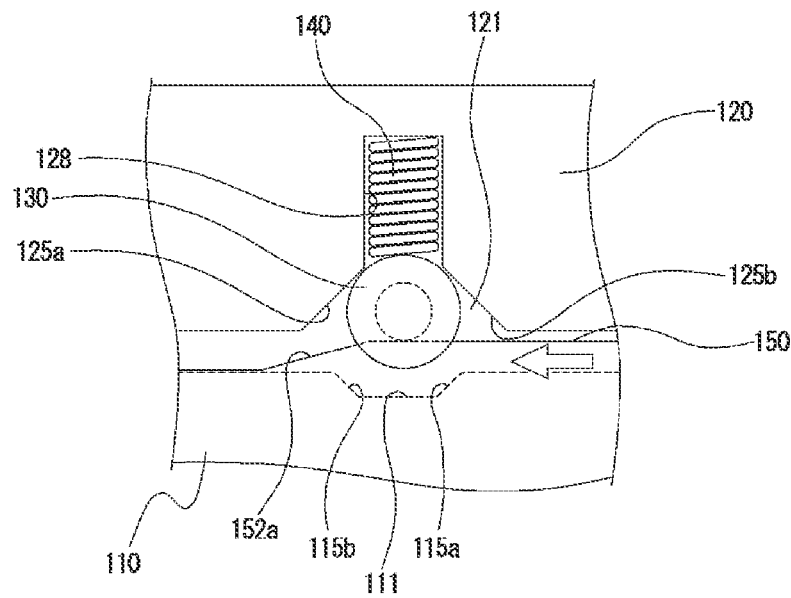

POSITIVE CLUTCH

BACKGROUND OF THE INVENTION

1. Field of the Invention

The present invention relates to a positive clutch that couples an input shaft and an output shaft by mechanical engagement.

2. Description of the Related Art

Friction clutches and positive clutches are known as types of mechanical clutches that transmit or interrupt power (torque) from an input shaft to an output shaft. Friction clutches use a frictional force to couple the input shaft and the output shaft while positive clutches use mechanical engagement to couple the input shaft and the output shaft.

One known type of friction clutch uses a plurality of torque transmission members, such as cylindrical rollers, interposed between an inner race and an outer race that are coaxial and rotatable relative to each other (see, for example, Japanese Patent Application Publication No. 2020-133686). To transmit torque, the relative rotation between the inner race and the outer race is stopped by frictional engagement between the torque transmission members and the inner and outer races.

Ratchet-type clutches are a known type of positive clutch, which has a ratchet mechanism composed of a plurality of pawls, for example, which act as torque transmission members, and provided in inner circumferential portions of the outer race, and notches in outer circumferential portions of the inner race for the pawls to engage with (see, for example, Japanese Patent Application Publications Nos. 2021-120586, 2021-156426, and 2022-038806). These ratchet-type clutches use springs to bias the pawls toward the notches for stable engagement between the pawls and clutches.

SUMMARY OF THE INVENTION

One of the issues with the friction clutch mentioned above is low rigidity due to windup (i.e., torsional deflection), which occurs during torque transmission.

Ratchet-type clutches, on the other hand, tend to have a large overall length due to the complex structure. A two-way clutch configuration, in particular, requires pairs of pawls to be disposed opposite each other as described in Japanese Patent Application Publication No. 2022-038806, which tends to increase the bulkiness. This problem makes it difficult to handle high torque with a ratchet-type clutch.

Another issue with ratchet-type clutches is the possibility of chipping upon impact or wear of the pawls because of the high surface pressure applied to small torque-receiving surfaces thereof.

The present invention has been made under the circumstances described above and it is an object of the invention to provide a positive clutch that has a high rigidity and simple structure, reduces friction loss, prevents noise generation, allows a size reduction, and helps extend the service life.

The present invention achieves the above object by providing a positive clutch including: an inner race and an outer race that are coaxial and rotatable relative to each other; a plurality of rollers disposed between the inner race and the outer race; a biasing means for radially biasing each of the plurality of rollers; roller support parts formed on one of an outer circumferential surface of the inner race and an inner circumferential surface of the outer race to support the rollers, the roller support parts each including an inclined surface portion having a flat inclined surface extending at an angle relative to a circumferential direction; and pocket parts adapted to accommodate the rollers and formed on the other one of the outer circumferential surface of the inner race and the inner circumferential surface of the outer race, the pocket parts each including an inclined surface portion having a flat inclined surface extending at an angle relative to the circumferential direction. The clutch is configured to stop relative rotation of the outer race and the inner race by holding the rollers between the inclined surface portions of the roller support parts and the inclined surface portions of the pocket parts in the circumferential direction.

According to one aspect of the present application, torque transmission between the inner race and the outer race is achieved by holding the rollers between the inclined surface portions of the roller support parts and the inclined surface portions of the pocket parts in the circumferential direction. Therefore, no windup or torsional deflection occurs when torque is transmitted, which allows the positive clutch to be designed as a high-rigidity clutch. The simple structure that achieves stable engagement allows for size reduction and the placement of a large number of rollers in a small space. This enables the transmission of high torque. Moreover, the surface pressure applied to the rollers and the inclined surfaces that hold the rollers during torque transmission can be set low, allowing the clutch to be designed with an inexpensive material that is more resistant to chipping, which may be caused by impact, or wear. Since the rollers rotate themselves and hardly engage at the same point, the durability of the clutch can be improved and its service life can be extended.

The another aspect of the present application allows the operating modes of the positive clutch to be switched easily. Since the rollers are separated from the inner race or outer race in the free mode in which the inner race and outer race are allowed to rotate relative to each other, friction loss and noise can be reduced.

The another aspect of the present application enables a size reduction, switching between four operating modes, and transmission of high torque.

The another aspect of the present application eliminates the need to provide multiple biasing means corresponding to the plurality of rollers. This reduces the number of components and helps reduce the size of the clutch.

The another aspect of the present application allows the rollers to roll more easily and can help reduce the ratchet noise.

The another aspect of the present application helps reduce backlash and allows for smooth engagement.

BRIEF DESCRIPTION OF THE DRAWINGS

FIG. 6B is a diagram illustrating a state of the positive clutch in the reverse lock mode shown in FIG. 1 when the inner race is rotated in the forward direction;

FIG. 6C is a diagram illustrating a state of the positive clutch in the reverse lock mode shown in FIG. 1 when the inner race is rotated in the reverse direction;

FIG. 7 is a schematic diagram illustrating a standby state of the positive clutch shown in FIG. 1 when the operating mode is a two-way free mode;

FIG. 22 is a schematic diagram illustrating a standby state of the positive clutch when the operating mode is the forward lock mode;

FIG. 23 is a plan view illustrating a state of the positive clutch, when the operating mode is the two-way free mode, with some parts being omitted;

FIG. 26C is a diagram illustrating a state of the positive clutch in the two-way lock mode shown in FIG. 26A when the inner race is rotated in the reverse direction; and FIG. 27 is a schematic diagram illustrating a standby state of the positive clutch shown in FIG. 26A when the operating mode is the two-way free mode.

DESCRIPTION OF THE PREFERRED EMBODIMENTS

Figure 1:
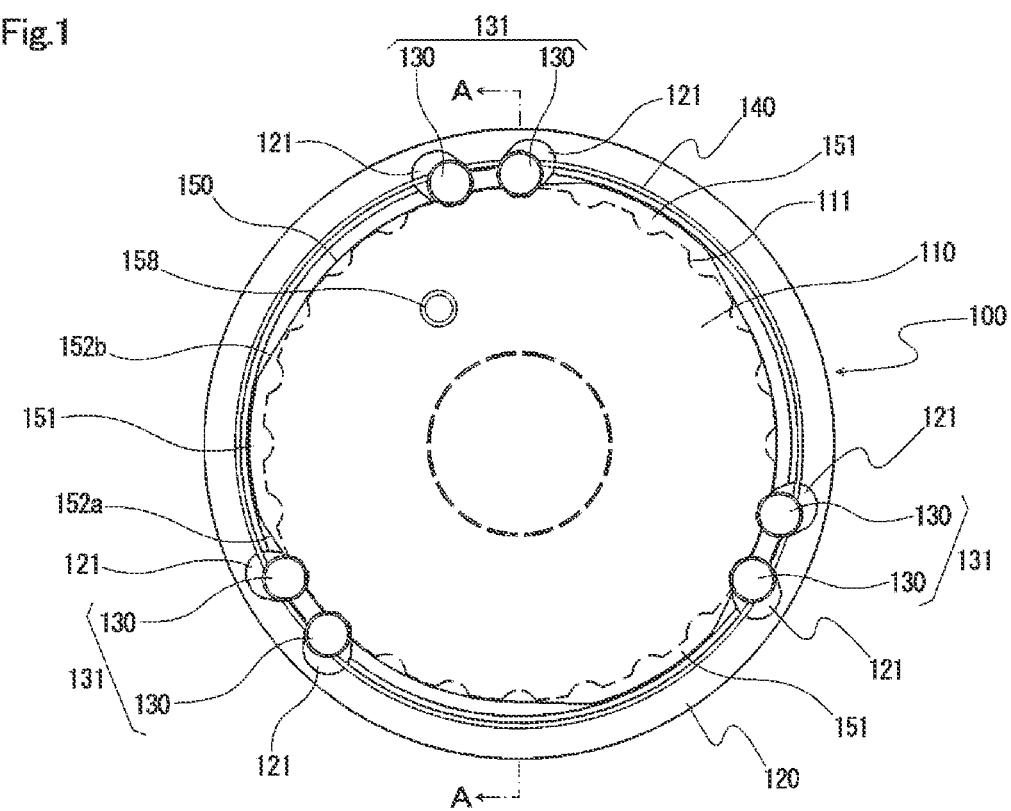
FIG. 1 is a front view illustrating one configuration example of a positive clutch according to a first embodiment of the present invention.
Figure 2:
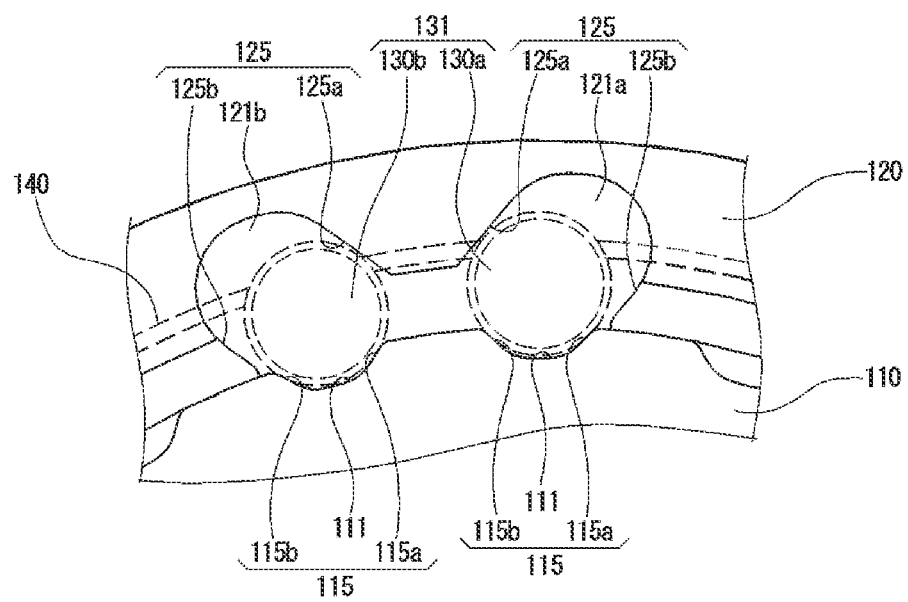
FIG. 2 is an enlarged view illustrating essential parts of the positive clutch shown in FIG. 1 with some parts omitted.
Figure 3:
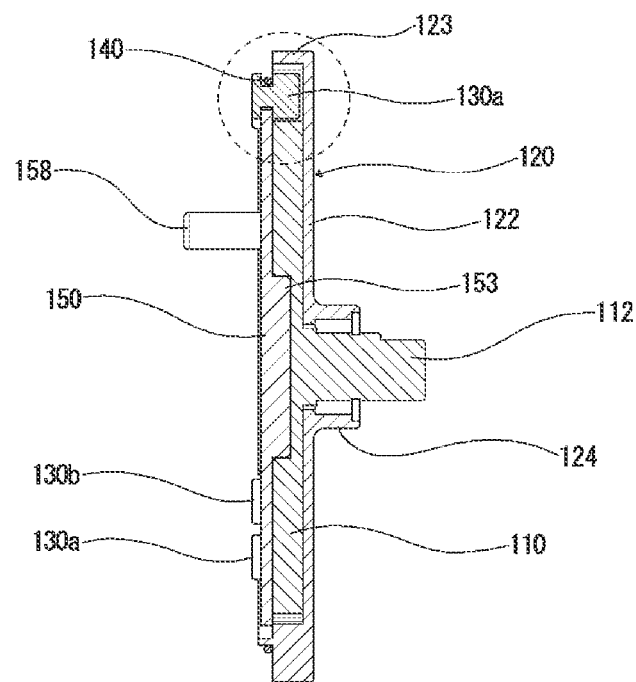
FIG. 3 is a cross-sectional view along A-A in FIG. 1.
Figure 4:
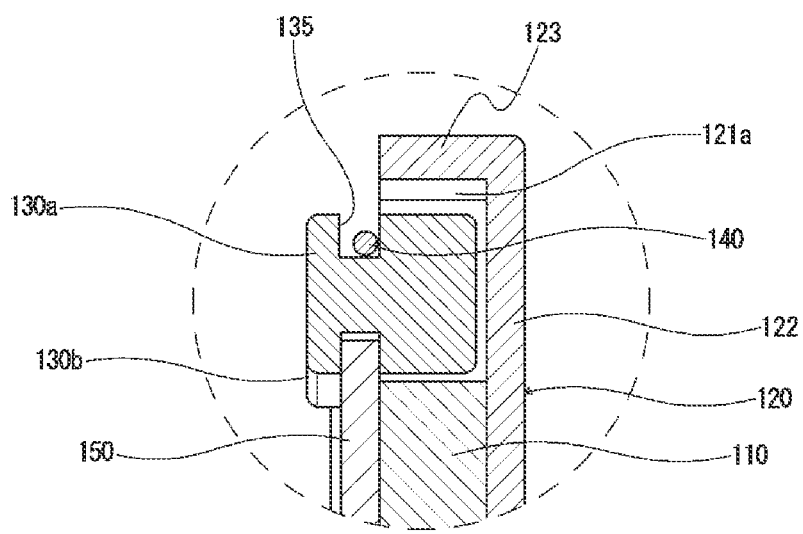
FIG. 4 is an enlarged cross-sectional view illustrating the area encircled by a broken line in FIG. 3.

Positive clutches according to some embodiments of the present invention are described below with reference to the drawings.

First Embodiment

As shown in FIG. 1 to FIG. 4, the positive clutch 100 according to the first embodiment includes an inner race 110 and an outer race 120 that are coaxial and rotatable relative to each other, a plurality of cylindrical rollers 130 disposed between the inner race 110 and the outer race 120, a biasing means 140 radially biasing each of the plurality of rollers 130, and a switching member 150 for switching the operating modes of the positive clutch 100. Although not shown, this positive clutch 100 includes a cylindrical cover member with a bottom that is fitted to the outer race 120 from the front side (i.e., the left side in FIG. 3).

Henceforth, for convenience, the counterclockwise direction in FIG. 1 will be referred to as the forward direction, and the clockwise direction as the reverse direction.

The inner race 110 is disc-shaped and includes a shaft part 112 that extends axially outward on the back side in the axial direction.

The outer race 120 is a cylindrical component with the back side in the axial direction thereof being closed by a bottom plate part. A through hole is formed in the center of the bottom plate part 122 for the shaft part 112 of the inner race 110 to pass through. A bearing part 124 extends axially outward from the back side of the bottom plate part 122 to support the shaft part 112 of the inner race 110 in a rotatable manner.

Roller support parts 111 that support the rollers 130 are provided on either the outer circumferential surface of the inner race 110 or the inner circumferential surface of the outer race 120 at predetermined circumferential intervals. While the roller support parts 111 are formed on the outer circumferential surface of the inner race 110 in this embodiment, the roller support parts may be formed on the inner circumferential surface of the outer race 120. In the latter case, a centrifugal force will act on the rollers 130 in the roller support parts 111, so that the rollers 130 will be held securely in the circumferential direction between the roller support parts and inclined surface portions of pocket parts on the inner race side during torque transmission, which can help achieve stable engagement.

In this positive clutch 100, two rollers 130, each held in each of two adjacent roller support parts 111, make a pair. A plurality of roller pairs 131 are arranged at predetermined circumferential intervals. While this embodiment shows a configuration in which three roller pairs 131 are circumferentially equally spaced apart, the number of roller pairs 131 is not limited to a particular number, nor do the roller pairs 131 need be equally spaced apart. Henceforth one roller 130 of the roller pair 131 located on the side in the direction of reverse rotation will be referred to as the first roller 130a, and the roller 130 on the side in the direction of forward rotation as the second roller 130b. Unless otherwise specified, the term "roller 130" refers to either the first roller 130a or the second roller 130b.

The roller support part 111 is a groove that extends in the direction of rotation axis, and supports the underside of the roller 130. The roller support part 111 widens its groove width from the bottom radially outward, and includes an inclined surface portion 115 that has a flat inclined surface inclined to the circumferential direction. The inclined surface portion 115 includes a first inclined surface 115a that forms a side wall on one circumferential side of the roller support part 111 (in the direction of reverse rotation), and a second inclined surface 115b that forms a side wall on the other circumferential side of the roller support part 111 (in the direction of forward direction).

The opening edge of the roller support part 111 is chamfered, for example, as viewed in cross section, which can help facilitate the rolling of the rollers 130 and reduce the ratchet noise.

When this positive clutch 100 is in a lock mode in which the inner race 110 is prevented from rotating in the forward direction relative to the outer race 120, for example, the first inclined surface 115a of the roller support part 111, which supports the first roller 130a, serves as an engagement surface that makes contact with the first roller 130a. In another lock mode of a positive clutch 100 in which the inner race 110 is prevented from rotating in the reverse direction relative to the outer race 120, for example, the second inclined surface 115b of the roller support part 111, which supports the second roller 130b, serves as an engagement surface that makes contact with the second roller 130b.

A plurality of pocket parts 121, each corresponding to each of the plurality of rollers 130, are formed in the inner circumferential surface of a tubular part 123 of the outer race 120. The pocket part 121 is adapted to accommodate a roller 130 inside to allow the roller 130 to separate from the inner race 110, and has a curved bottom surface that conforms to the outer circumferential surface of the roller 130, for example.

A first pocket part 121a corresponding to the first roller 130a extends obliquely in one circumferential direction radially outward. A second pocket part 121b corresponding to the second roller 130b extends obliquely in a different circumferential direction radially outward.

The first pocket part 121a and second pocket part 121b each include an inclined surface portion 125 with a flat inclined surface that extends at an angle relative to the circumferential direction. The inclined surface portion 125 includes a third inclined surface 125a located on the radially outer side and a fourth inclined surface 125b located on the radially inner side.

In the lock mode of the positive clutch 100 in which the inner race 110 is prevented from rotating in the forward direction relative to the outer race 120, for example, the third inclined surface 125a of the first pocket part 121a serves as an engagement surface that makes contact with the first roller 130a. In another lock mode of the positive clutch 100 in which the inner race 110 is prevented from rotating in the reverse direction relative to the outer race 120, for example, the third inclined surface 125a of the second pocket part 121b serves as an engagement surface that makes contact with the second roller 130b.

The biasing means 140 in this embodiment is a garter spring, for example. A mounting groove 135 extends circumferentially on the outer circumferential surface of each of the plurality of rollers 130, and the biasing means is mounted in these mounting grooves. Using a garter spring as the biasing means 140 eliminates the need to provide multiple biasing means corresponding to the plurality of rollers 130. This reduces the number of components and helps reduce the size of the clutch.

The switching member 150 in this embodiment is composed of a plate member that can rotate independently of the inner race 110 and outer race 120, for example, and includes an outwardly protruding columnar protrusion 153 in the center on the back side. Reference numeral 158 denotes a rod-like operating part that is an integral part of the switching member 150 and extends in the direction of the rotation axis.

The switching member 150 is slidably held in the respective mounting grooves 135 of the plurality of rollers 130. The columnar protrusion 153 is disposed in a rotatable manner inside a recess formed on the front side of the inner race 110.

The switching member 150 has a plurality of roller position changing parts 151, with each part corresponding to each of the plurality of roller pairs 131. The roller position changing part 151 is configured to move one or both of the first roller 130a and second roller 130b between the roller support part(s) 111 and the corresponding first pocket part 121a and/or second pocket part 121b. Each roller position changing part includes a first cam surface 152a that gradually increases in outside diameter as the switching member 150 rotates in the forward direction, and a second cam surface 152b that gradually decreases in outside diameter as the switching member 150 rotates in the forward direction.

The operation of the above positive clutch 100 is described below.

The positive clutch 100 according to this embodiment can switch between four operating modes: a two-way lock mode, which stops relative rotation between the inner race 110 and the outer race 120 in both the forward direction and reverse direction; a forward lock mode, which stops relative rotation between the inner race 110 and the outer race 120 in the forward direction; a reverse lock mode, which stops relative rotation between the inner race 110 and the outer race 120 in the reverse direction; and a two-way free mode, which allows relative rotation between the inner race 110 and the outer race 120 in both the forward and reverse directions.

First, the operation of the positive clutch 100 when the switching member 150 is in the non-operating state will be described.

Figure 5A:
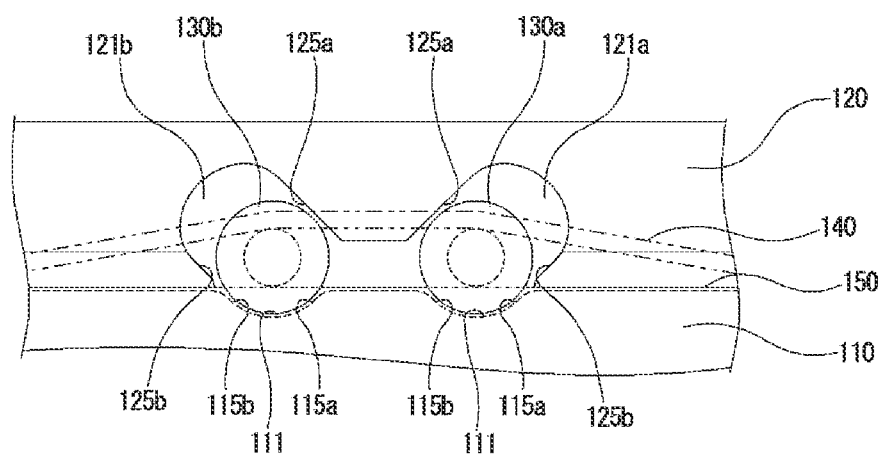
FIG. 5A is a schematic diagram illustrating a standby state of the positive clutch shown in FIG. 1 when the operating mode is a two-way lock mode.

As shown in FIG. 5A, when the switching member 150 is fixed in a first fixed position and in the non-operating state, the first roller 130a and second roller 130b are maintained in a standby state where they can immediately start engaging with the inner race 110 and outer race 120 upon application of torque on either the inner race 110 or the outer race 120. The operating mode of the positive clutch 100 is therefore the two-way lock mode. For convenience of explanation, FIG. 5A illustrates the outer circumferential surface of the inner race 110 and the inner circumferential surface of the outer race 120 as parallel flat surfaces. The same applies to FIG. 5B and FIG. 5C.

Figure 5B:
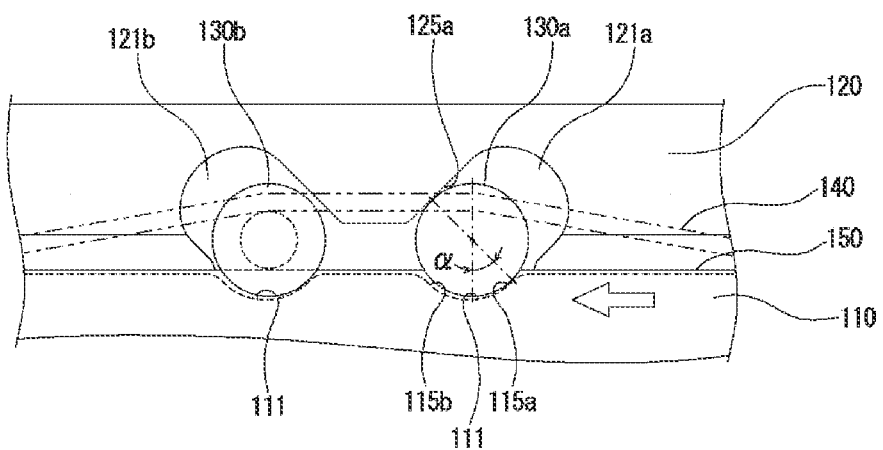
FIG. 5B is a diagram illustrating a state of the positive clutch in the two-way lock mode shown in FIG. 1 when the inner race is rotated in the forward direction.

When the inner race 110 is rotated in the forward direction, the first roller 130a is held between the first inclined surface 115a of the roller support part 111 that supports the first roller 130a, and the third inclined surface 125a of the first pocket part 121a, in the circumferential direction as shown in FIG. 5B. Thus the inner race 110 engages with the outer race 120.

When the first roller 130a is held between the first inclined surface 115a and the third inclined surface 125a, the contact angle α of a line connecting the respective contact points of the first and third inclined surfaces 115a and 125a with the first roller 130a relative to the radial direction (which extends along a line connecting the rotation axis of the positive clutch 100 and the center of the first roller 130a) is smaller than 90°. A contact angle α closer to 90° causes a smaller normal component of the input load to be generated, which allows for reliable backstop (reverse rotation prevention). With the contact angle α closer to 0°, the step on the inner race 110 will be smaller, which provides lower rolling resistance for the roller 130 in the one-way lock mode.

Meanwhile, the second roller 130b stays in the standby state because the second pocket part 121b has no inclined surface opposite the first inclined surface 115a of the roller support part 111 that supports the second roller 130b for holding the second roller 130b therebetween.

Figure 5C:
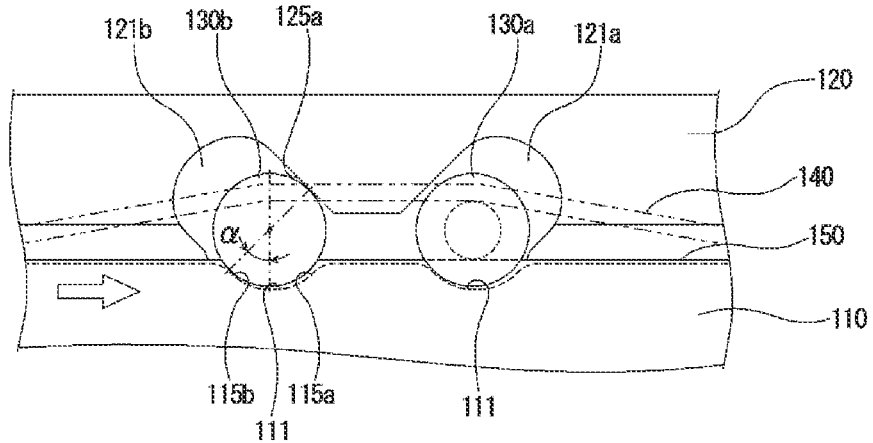
FIG. 5C is a diagram illustrating a state of the positive clutch in the two-way lock mode shown in FIG. 1 when the inner race is rotated in the reverse direction.

When the inner race 110 is rotated in the reverse direction, the second roller 130b is held between the second inclined surface 115b of the roller support part 111 that supports the second roller 130b, and the third inclined surface 125a of the second pocket part 121b, in the circumferential direction as shown in FIG. 5C. Thus the inner race 110 engages with the outer race 120.

The second roller 130b is held between the second inclined surface 115b and the third inclined surface 125a with the contact angle α being smaller than 90°.

Meanwhile, the first roller 130a stays in the standby state because the first pocket part 121a has no inclined surface opposite the second inclined surface 115b of the roller support part 111 that supports the first roller 130a for holding the first roller 130a therebetween.

Next, the operation of switching the operating modes of the positive clutch 100 will be described with reference to FIG. 6A to FIG. 6C and FIG. 7. For convenience of explanation, FIG. 6A to FIG. 6C and FIG. 7 illustrate the outer circumferential surface of the inner race 110 and the inner circumferential surface of the outer race 120 as parallel flat surfaces.

Figure 6A:
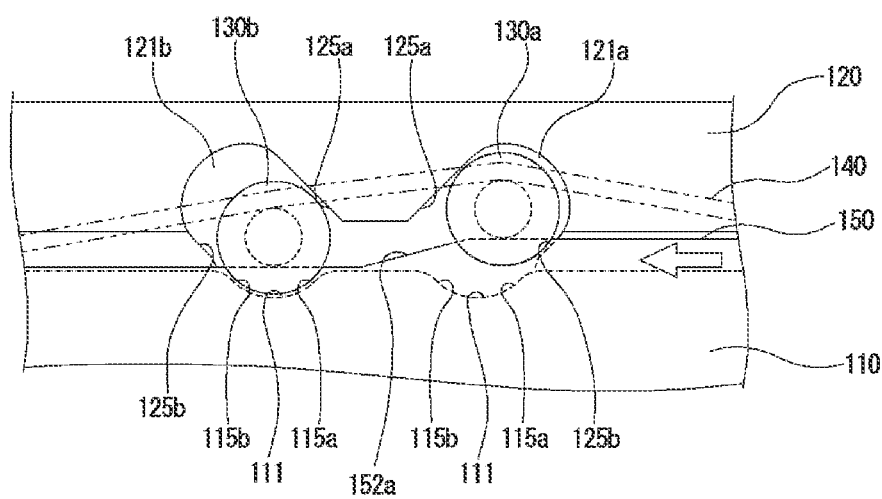
FIG. 6A is a schematic diagram illustrating a standby state of the positive clutch shown in FIG. 1 when the operating mode is a reverse lock mode.
Figure 8:
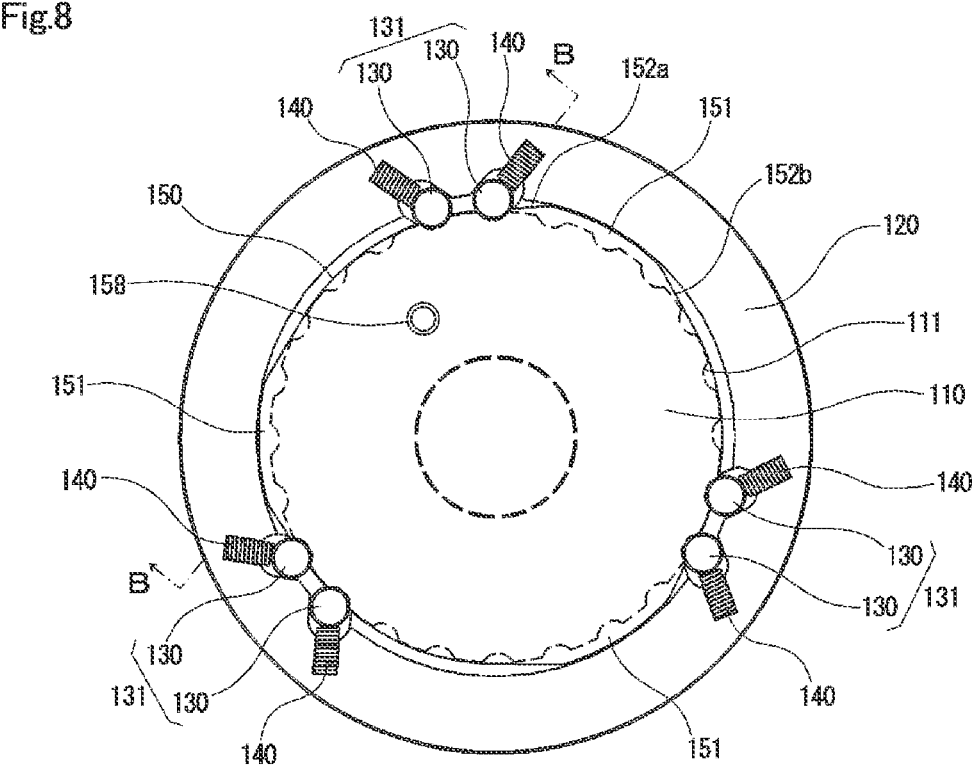
FIG. 8 is a front view illustrating one configuration example of a positive clutch according to a second embodiment of the present invention.

With the positive clutch 100 set in the two-way lock mode, when the switching member 150 is rotated in the forward direction for example, as shown in FIG. 6A, and fixed in a second fixed position, only the first roller 130a of the roller pair is moved into the first pocket part 121a by the action of the first cam surface 152a of the roller position changing part 151 against the biasing force exerted by the biasing means 140. The first roller 130a is thus held in a position separated from the inner race 110.

When the inner race 110 is rotated in the forward direction in this state, as shown in FIG. 6B, the second roller 130b rolls onto the outer circumferential surface of the inner race 110 toward the second pocket part 121b, because the second pocket part 121b has no inclined surface opposite the first inclined surface 115a of the roller support part 111 that supports the second roller 130b for holding the second roller 130b therebetween, allowing the inner race 110 to freewheel.

When the inner race 110 is rotated in the reverse direction, the second roller 130b is held between the second inclined surface 115b of the roller support part 111 that supports the second roller 130b, and the third inclined surface 125a of the second pocket part 121b, in the circumferential direction as shown in FIG. 6C. Thus the inner race 110 engages with the outer race 120. In this state, the contact angle α of the second roller 130b is smaller than 90°.

The operating mode of the positive clutch 100 can be switched from the two-way lock mode to the reverse lock mode in this way by rotating the switching member 150 in the forward direction to hold the first roller 130a separated from the inner race 110.

Although not shown, the operating mode of the positive clutch 100 may be switched from the two-way lock mode to a forward lock mode by rotating the switching member 150 to hold only the second roller 130b of the roller pair separated from the inner race 110.

When the switching member 150 is rotated in the forward direction and fixed in a third fixed position, as shown in FIG. 7, both of the first roller 130a and second roller 130b of the roller pair are moved into the first pocket part 121a and second pocket part 121b respectively by the action of the first cam surface 152a of the roller position changing part 151 against the biasing force exerted by the biasing means 140. Both of the first roller 130a and second roller 130b are thus held in a position separated from the inner race 110.

In this state, the inner race 110 freewheels when rotated, whether in the forward direction or in the reverse direction.

The operating mode of the positive clutch 100 can be switched to the two-way free mode in this way by rotating the switching member 150 in the forward direction to hold the first roller 130a and second roller 130b separated from the inner race 110.

The positive clutch 100 described above achieves torque transmission between the inner race 110 and the outer race 120 by holding the first roller 130a between the first inclined surface 115a of the roller support part 111 that supports the first roller 130a and the third inclined surface 125a of the first pocket part 121a in the circumferential direction, or, by holding the second roller 130b between the second inclined surface 115b of the roller support part 111 that supports the second roller 130b and the third inclined surface 125a of the second pocket part 121b in the circumferential direction. As a result, no windup or torsional deflection occurs when torque is transmitted, which allows the positive clutch 100 to be designed as a high-rigidity clutch. The simple structure that achieves stable engagement allows for size reduction and the placement of a large number of rollers 130 in a small space. This enables the transmission of high torque. Moreover, the surface pressure applied to the inclined surface portions and rollers 130 during torque transmission can be set low, allowing the clutch to be designed with an inexpensive material that is more resistant to chipping, which may be caused by impact, or wear. Since the rollers 130 rotate themselves and hardly engage at the same point, the durability of the clutch can be improved and its service life can be extended.

The switching member 150 can separate the roller(s) 130 from the inner race 110 by the action of either the first cam surface 152a or the second cam surface 152b. Therefore, the operating modes of the positive clutch 100 can be easily switched by simply rotating the switching member 150. In the free mode in which the inner race 110 and outer race 120 are allowed to rotate relative to each other, all of the plurality of rollers 130 are separated from the inner race 110. This can help reduce friction loss and noise.

Second Embodiment

In the configuration of the first embodiment described above, a garter spring is used as the biasing means. Alternatively, a plurality of biasing means may be provided corresponding to the plurality of rollers. FIG. 8 to FIG. 11 illustrate one configuration example of the positive clutch according to a second embodiment of the present invention.

The basic configuration of the positive clutch 100 according to the second embodiment is the same as the positive clutch 100 of the first embodiment. For convenience, the same reference numerals are assigned to the components that are common to both positive clutches 100 in FIG. 8 to FIG. 11.

Figure 9:
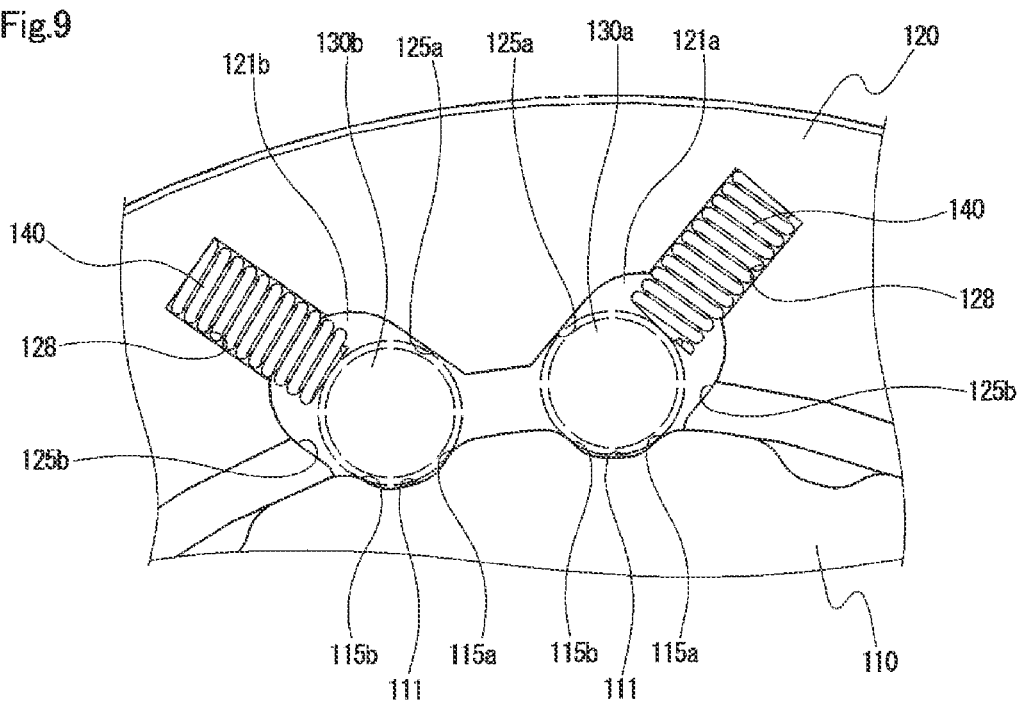
FIG. 9 is an enlarged view illustrating essential parts of the positive clutch shown in FIG. 8 with some parts omitted.
Figure 10:
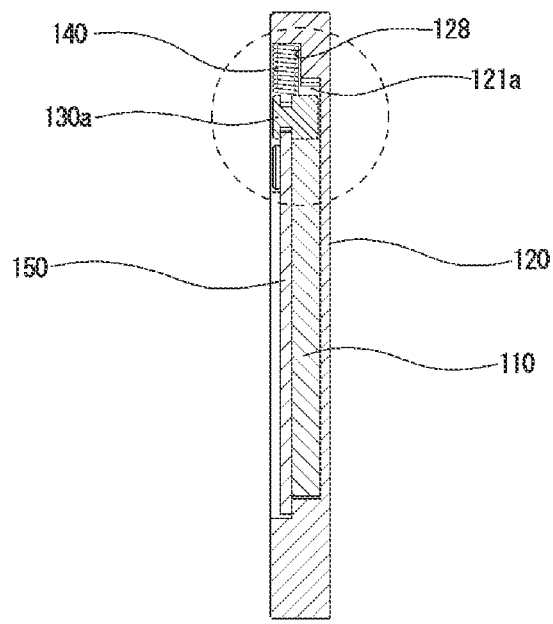
FIG. 10 is a cross-sectional view along B-B in FIG. 8.
Figure 11:
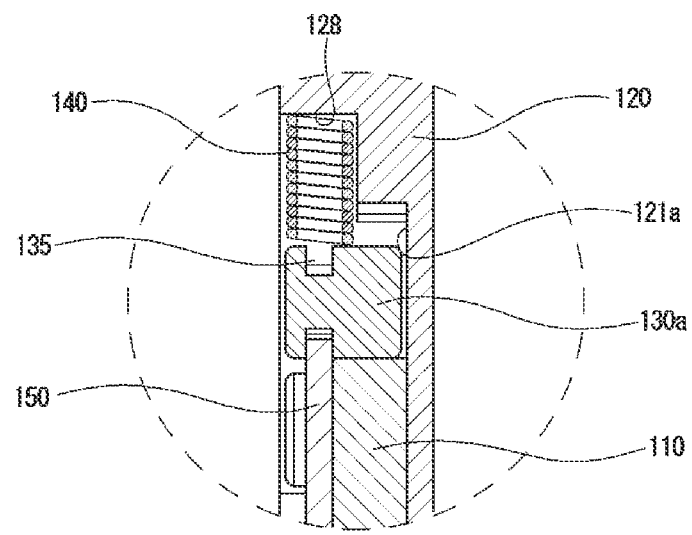
FIG. 11 is an enlarged cross-sectional view illustrating the area encircled by a broken line in FIG. 10.

In this positive clutch 100, as shown in FIG. 9, each of the first pocket part 121a and second pocket part 121b in the inner circumferential surface of the tubular part 123 of the outer race 120 is formed with a spring accommodating hole 128 that extends continuously from the bottom surface of the first pocket part 121a or the second pocket part 121b in the same inclining direction as the first pocket part 121a and second pocket part 121b do.

The biasing means 140 is typically a coil spring, and provided in plurality, each of which is disposed in each of the spring accommodating holes 128 corresponding to each of the plurality of rollers 130 and free to expand and contract.

In the positive clutch 100 according to this embodiment, when the switching member 150 is fixed in the first fixed position and in the non-operating state (i.e., in the state shown in FIG. 9), the first roller 130a and second roller 130b are maintained in the standby state where they can immediately start engaging with the inner race 110 and outer race 120 upon application of torque on either the inner race 110 or the outer race 120. The operating mode of the positive clutch 100 in this state is therefore the two-way lock mode.

When the inner race 110 is rotated in the forward direction, the first roller 130a is held between the first inclined surface 115a of the roller support part 111 that supports the first roller 130a, and the third inclined surface 125a of the first pocket part 121a, in the circumferential direction. Thus the inner race 110 engages with the outer race 120.

Meanwhile, the second roller 130b stays in the standby state because the second pocket part 121b has no inclined surface opposite the first inclined surface 115a of the roller support part 111 that supports the second roller 130b for holding the second roller 130b therebetween.

When the inner race 110 is rotated in the reverse direction, the second roller 130b is held between the second inclined surface 115b of the roller support part 111 that supports the second roller 130b, and the third inclined surface 125a of the second pocket part 121b, in the circumferential direction. Thus the inner race 110 engages with the outer race 120.

Meanwhile, the first roller 130a stays in the standby state because the first pocket part 121a has no inclined surface opposite the second inclined surface 115b of the roller support part 111 that supports the first roller 130a for holding the first roller 130a therebetween.

Similarly to the one described in the foregoing, this positive clutch 100 also allows its operating mode to be switched from the two-way lock mode to the reverse lock mode, for example, by rotating the switching member 150 in the forward direction to hold the first roller 130a separated from the inner race 110.

Figure 12:
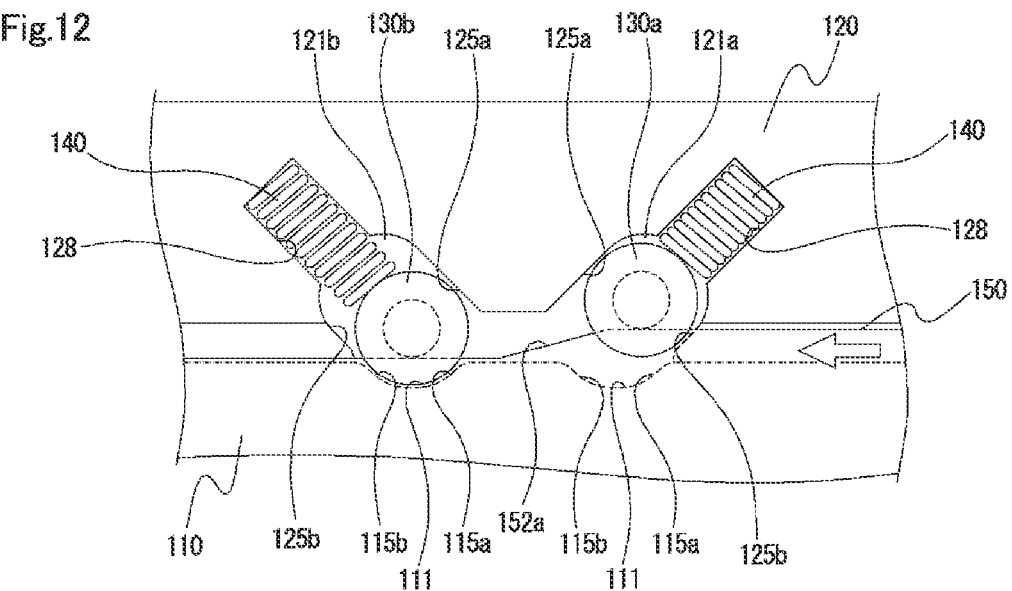
FIG. 12 is a schematic diagram illustrating a standby state of the positive clutch shown in FIG. 8 when the operating mode is the reverse lock mode.

Namely, with the positive clutch 100 set in the two-way lock mode, when the switching member 150 is rotated in the forward direction for example, as shown in FIG. 12, and fixed in the second fixed position, only the first roller 130a of the roller pair is moved into the first pocket part 121a by the action of the first cam surface 152a of the roller position changing part 151 against the biasing force exerted by the biasing means 140. The first roller 130a is thus held in a position separated from the inner race 110.

When the inner race 110 is rotated in the forward direction in this state, the second roller 130b rolls onto the outer circumferential surface of the inner race 110 toward the second pocket part 121b, because the second pocket part 121b has no inclined surface opposite the first inclined surface 115a of the roller support part 111 that supports the second roller 130b for holding the second roller 130b therebetween, allowing the inner race 110 to freewheel.

When the inner race 110 is rotated in the reverse direction, the second roller 130b is held between the second inclined surface 115b of the roller support part 111 that supports the second roller 130b, and the third inclined surface 125a of the second pocket part 121b, in the circumferential direction. Thus the inner race 110 engages with the outer race 120.

In this positive clutch, when the first roller 130a is held between the first inclined surface 115a and the third inclined surface 125a in the circumferential direction, and when the second roller 130b is held between the second inclined surface 115b and the third inclined surface 125a in the circumferential direction, the contact angle of the first roller 130a and of the second roller 130b is smaller than 90°.

The operating mode of the positive clutch 100 can be switched to the two-way free mode by rotating the switching member 150 in the forward direction to hold the first roller 130a and second roller 130b separated from the inner race 110.

Figure 13:
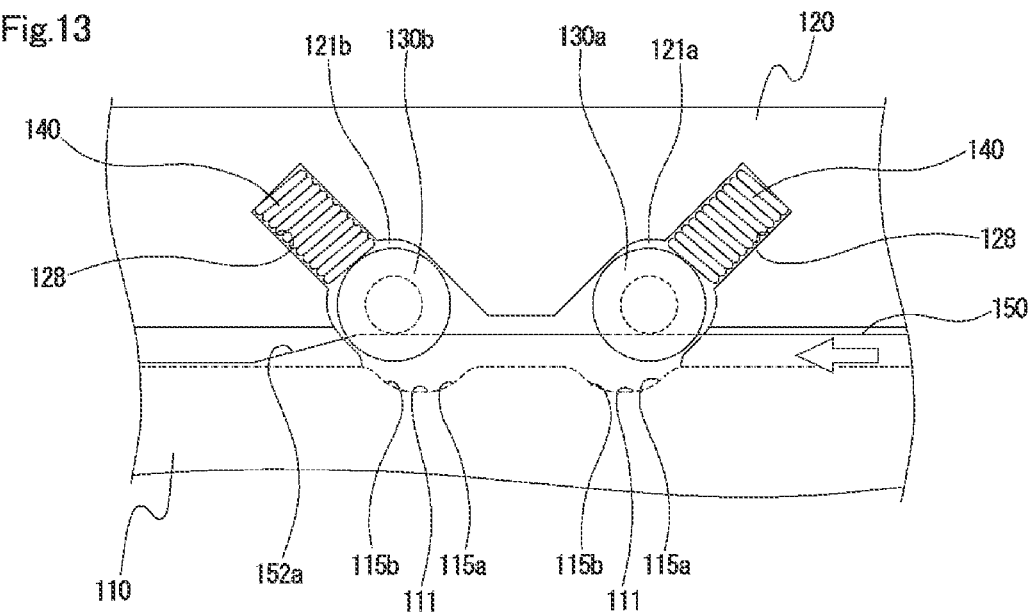
FIG. 13 is a schematic diagram illustrating a standby state of the positive clutch shown in FIG. 8 when the operating mode is the two-way free mode.

Namely, when the switching member 150 is rotated in the forward direction and fixed in the third fixed position, as shown in FIG. 13, both of the first roller 130a and second roller 130b of the roller pair are moved into the first pocket part 121a and second pocket part 121b respectively by the action of the first cam surface 152a of the roller position changing part 151 against the biasing force exerted by the biasing means 140. Both of the first roller 130a and second roller 130b are thus held in a position separated from the inner race 110.

In this state, the inner race 110 freewheels when rotated, whether in the forward direction or in the reverse direction.

The positive clutch 100 described above also provides the same advantageous effects as the positive clutch 100 described in the first embodiment.

Figure 14:
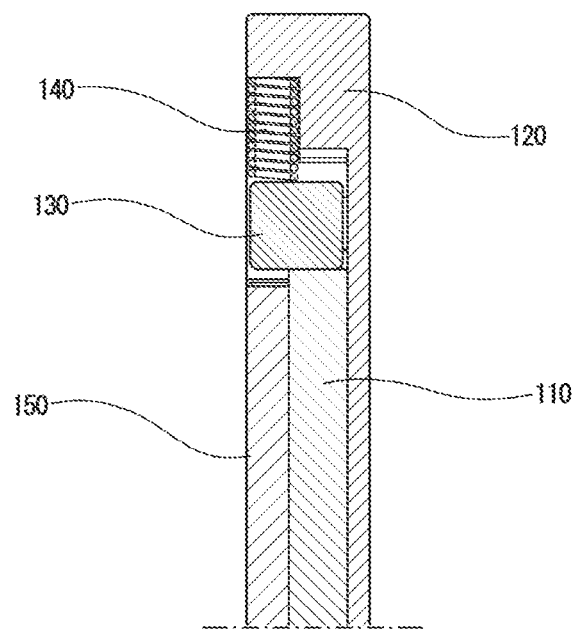
FIG. 14 is an enlarged cross-sectional view illustrating a part of a cross section along a plane containing the center axis of a coil spring and the rotation axis of the clutch in another configuration example of the positive clutch according to the second embodiment of the present invention.

While the rollers 130 of the positive clutch 100 according to this embodiment are formed with a mounting groove 135 on their outer circumferential surface, the rollers 130 may not include the mounting groove as shown in FIG. 14.

In the first and second embodiments described above, the rollers 130 are separated from the inner race 110 by rotating the switching member 150 independently of the inner race 110 and outer race 120, when switching the operating modes of the positive clutch 100. Alternatively, the switching member may be designed to separate the rollers 130 from either the inner race 110 or the outer race 120.

Third Embodiment

Figure 15:
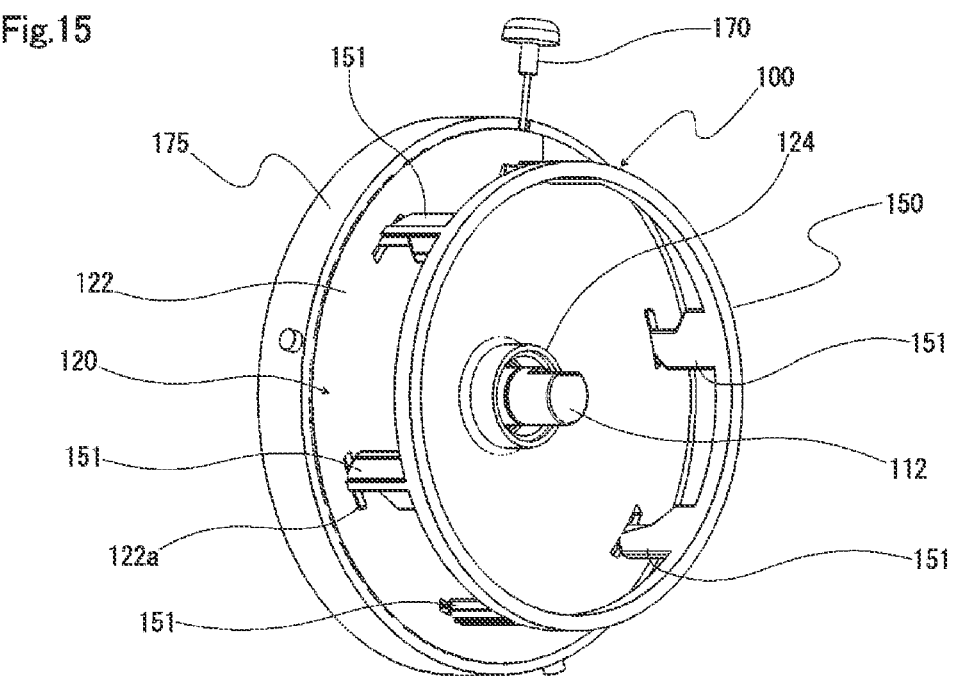
FIG. 15 is a perspective view illustrating one configuration example of a positive clutch according to a third embodiment of the present invention as seen from the back side in the axial direction.
Figure 16:
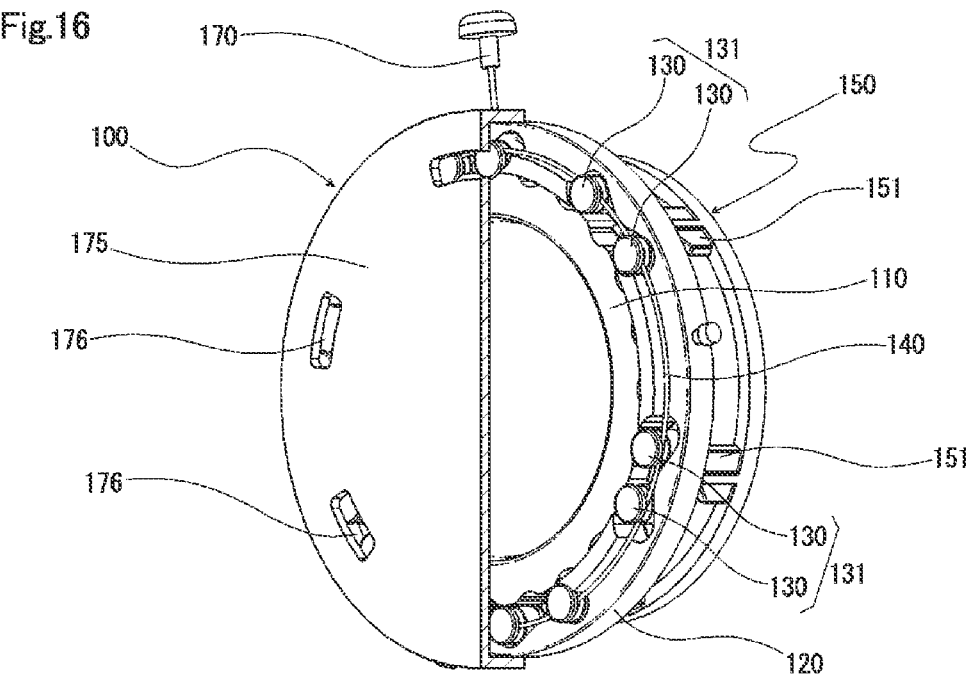
FIG. 16 is a partially broken perspective view illustrating the configuration of the positive clutch of FIG. 15 as seen from the front side in the axial direction.
Figure 17:
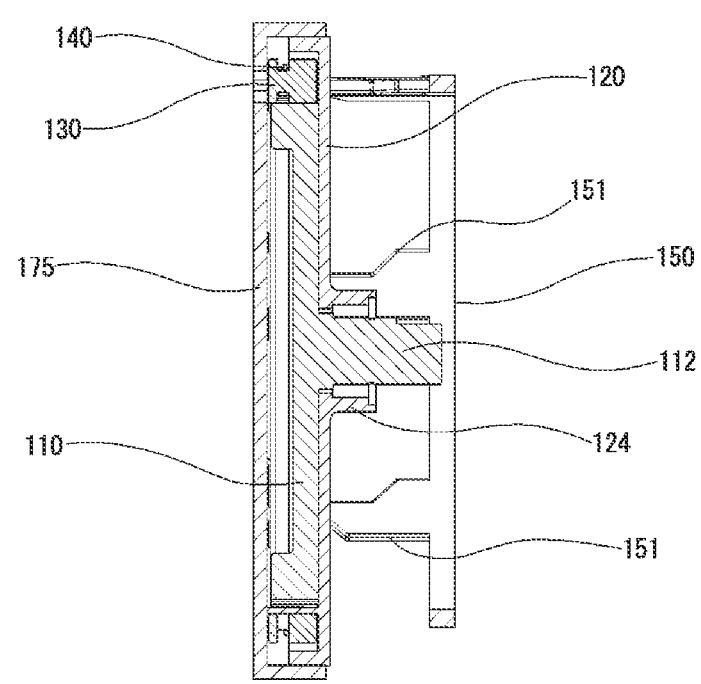
FIG. 17 is an axial cross-sectional view along the plane containing the rotation axis of the positive clutch shown in FIG. 15.

FIG. 15 is a perspective view illustrating one configuration example of the positive clutch according to a third embodiment of the present invention as seen from the back side in the axial direction. FIG. 16 is a partially broken perspective view illustrating the configuration of the positive clutch of FIG. 15 as seen from the front side in the axial direction. FIG. 17 is an axial cross-sectional view along a plane containing the rotation axis of the positive clutch shown in FIG. 15.

The positive clutch 100 according to the third embodiment has the same configuration as that of the positive clutch 100 of the first embodiment except for the switching member 150.

The switching member 150 in this embodiment is configured such as to be axially movable independently of the rotation of the inner race 110 and outer race 120.

Figure 18:
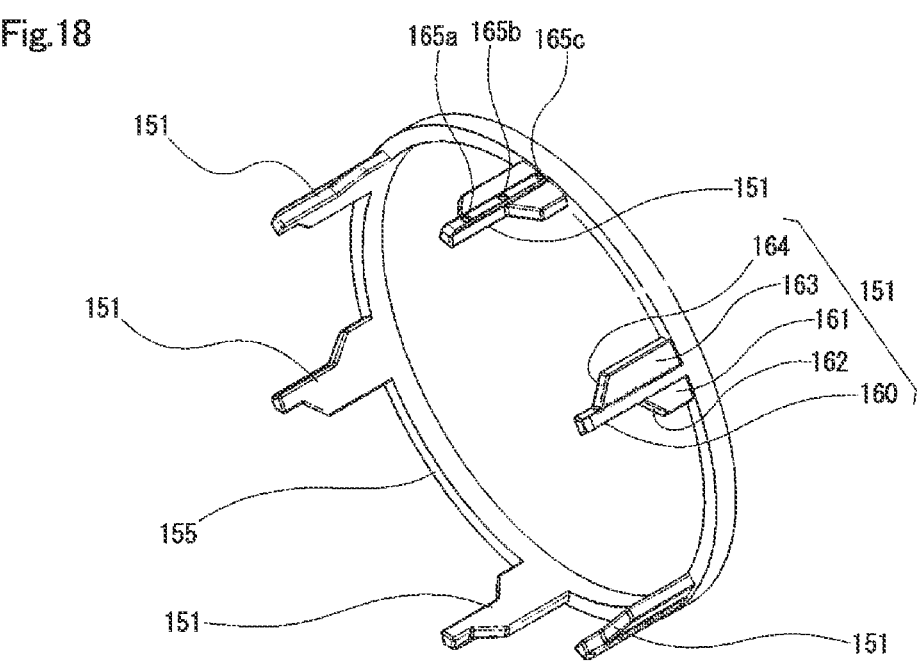
FIG. 18 is a perspective view illustrating the configuration of a switching member of the positive clutch of FIG. 15 as seen from the front side in the axial direction.

The switching member 150 includes a cylindrical base part 155, and a plurality of roller position changing parts 151 that axially extend from one end face of the base part 155, as shown in FIG. 18. Each of the roller position changing parts 151 corresponds to each of the plurality of roller pairs 131.

Each roller position changing part 151 has a pillar part 160, a first pressing part 161 on one circumferential side of the pillar part 160 (on the reverse direction side) for pressing the first roller 130*a*, and a second pressing part 163 on the other circumferential side of the pillar part 160 (on the forward direction side) for pressing the second roller 130*b*.

The first pressing part 161 has a first taper 162 that increases in width toward the back side in the axial direction. The second pressing part 163 has a second taper 164 that increases in width toward the back side in the axial direction.

The first taper 162 is located further towards the rear in the axial direction than the second taper 164, which enables a position change of the second roller 130*b* alone of the roller pair 131 or of both the first roller 130*a* and second roller 130*b* by adjusting the amount of axial movement of the switching member 150.

The pillar part 160 of one of the roller position changing parts 151 is formed with a first retention hole 165*a*, a second retention hole 165*b*, and a third retention hole 165*c*. The first retention hole 165*a* is used to fix the switching member 150 at the first fixed position to keep the switching member 150 in the non-operating state. The second retention hole 165*b* is used to fix the switching member 150 in the second fixing position to keep the second rollers 130*b* separated from the inner race 110. The third retention hole 165*c* is used to fix the switching member 150 in the third fixed position to keep the first rollers 130*a* and second rollers 130*b* separated from the inner race 110. The axial position of the switching member 150 can be fixed by inserting a position fixing pin 170 in one of the first retention hole 165*a*, second retention hole 165*b*, and third retention hole 165*c*.

The bottom plate part 122 of the outer race 120 has through holes 122*a*, which allow the plurality of roller position changing parts 151 of the switching member 150 to pass through. Each roller position changing part 151 is positioned between the first roller 130*a* and the second roller 130*b* of each roller pair 131, on the side of the inner race 110 in the radial direction. A cover member 175, which is fitted to the outer race 120 from the other side in the axial direction, also has through holes 176, which are aligned with the through holes 122*a* of the outer race 120 to allow the roller position changing parts 151 to pass through.

The operation of the positive clutch 100 according to the third embodiment of the present invention is described below.

The positive clutch 100 according to this embodiment can switch between four operating modes: a two-way lock mode, which stops relative rotation between the inner race 110 and the outer race 120 in both the forward direction and reverse direction; a forward lock mode, which stops relative rotation between the inner race 110 and the outer race 120 in the forward direction; a reverse lock mode, which stops relative rotation between the inner race 110 and the outer race 120 in the reverse direction; and a two-way free mode, which allows relative rotation between the inner race 110 and the outer race 120 in both the forward and reverse directions.

Figure 19:
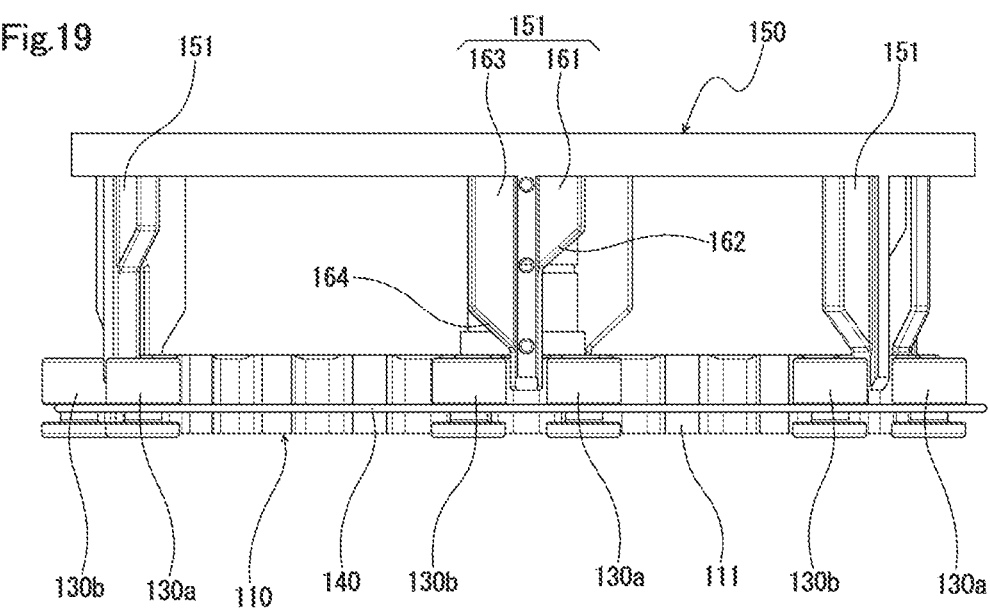
FIG. 19 is a plan view illustrating a state of the positive clutch, when the operating mode is the two-way lock mode, with some parts being omitted.
Figure 20:
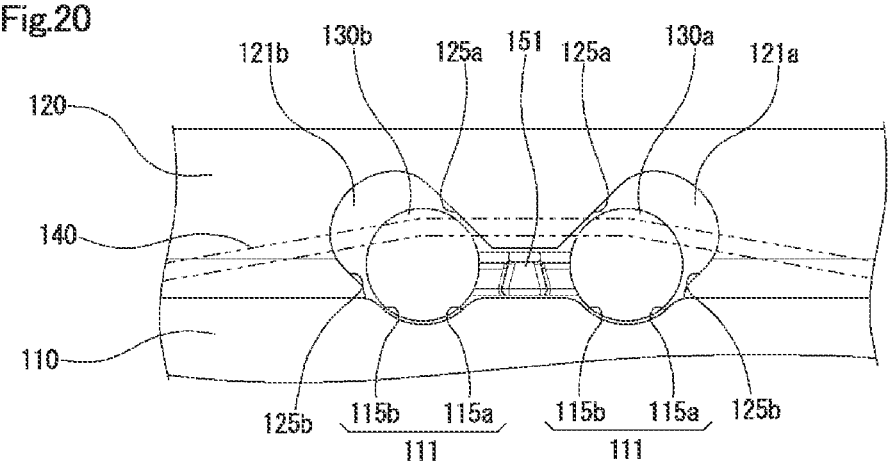
FIG. 20 is a schematic diagram illustrating a standby state of the positive clutch when the operating mode is the two-way lock mode.

First, when the switching member 150 is fixed in the first fixed position and in the non-operating state, as shown in FIG. 19, the first roller 130*a* and second roller 130*b* are maintained in the standby state where they can immediately start engaging with the inner race 110 and outer race 120 upon application of torque on either the inner race 110 or the outer race 120 as shown in FIG. 20. The operating mode of the positive clutch 100 is therefore the two-way lock mode. For convenience of explanation, FIG. 20 illustrates the outer circumferential surface of the inner race 110 and the inner circumferential surface of the outer race 120 as parallel flat surfaces.

When the inner race 110 is rotated in the forward direction, the first roller 130*a* is held between the first inclined surface 115*a* of the roller support part 111 that supports the first roller 130*a*, and the third inclined surface 125*a* of the first pocket part 121*a*, in the circumferential direction. Thus the inner race 110 engages with the outer race 120.

Meanwhile, the second roller 130*b* stays in the standby state because the second pocket part 121*b* has no inclined surface opposite the first inclined surface 115*a* of the roller support part 111 that supports the second roller 130*b* for holding the second roller 130*b* therebetween.

When the inner race 110 is rotated in the reverse direction, the second roller 130*b* is held between the second inclined surface 115*b* of the roller support part 111 that supports the second roller 130*b*, and the third inclined surface 125*a* of the second pocket part 121*b*, in the circumferential direction. Thus the inner race 110 engages with the outer race 120.

Meanwhile, the first roller 130*a* stays in the standby state because the first pocket part 121*a* has no inclined surface opposite the second inclined surface 115*b* of the roller support part 111 that supports the first roller 130*a* for holding the first roller 130*a* therebetween.

This positive clutch 100 also allows its operating mode to be switched from the two-way lock mode to the forward lock mode, for example, by holding the second roller 130*b* of the roller pair 131 separated from the inner race 110.

Figure 21:
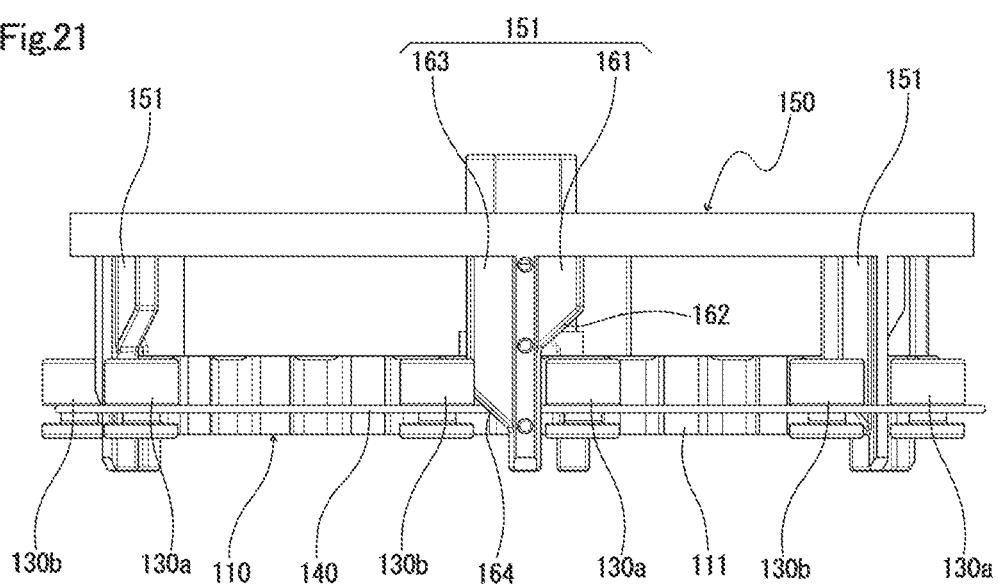
FIG. 21 is a plan view illustrating a state of the positive clutch, when the operating mode is the forward lock mode, with some parts being omitted.

Namely, with the positive clutch 100 set in the two-way lock mode, when the switching member 150 is axially moved to the front side and fixed in the second fixed position, for example, as shown in FIG. 21, only the second roller 130*b* of the roller pair 131 is moved into the second pocket part 121*b* by the action of the second taper 164 of the roller position changing part 151 as shown in FIG. 22 against the biasing force exerted by the biasing means 140. The second roller 130*b* is thus held in a position separated from the inner race 110.

When the inner race 110 is rotated in the forward direction in this state, the first roller 130*a* is held between the first inclined surface 115*a* of the roller support part 111 that supports the first roller 130*a*, and the third inclined surface 125*a* of the first pocket part 121*a*, in the circumferential direction. Thus the inner race 110 engages with the outer race 120.

When the inner race 110 is rotated in the reverse direction, the first roller 130*a* rolls onto the outer circumferential surface of the inner race 110 toward the first pocket part 121a, because the first pocket part 121a has no inclined surface opposite the second inclined surface 115b of the roller support part 111 that supports the first roller 130a for holding the first roller 130a therebetween, allowing the inner race 110 to freewheel.

In this positive clutch, when the first roller 130a is held between the first inclined surface 115a and the third inclined surface 125a in the circumferential direction, and when the second roller 130b is held between the second inclined surface 115b and the third inclined surface 125a in the circumferential direction, the contact angle of the first roller 130a and of the second roller 130b is smaller than 90°.

The operating mode of the positive clutch 100 can be switched to the two-way free mode by holding the first roller 130a and second roller 130b separated from the inner race 110.

Figure 24:
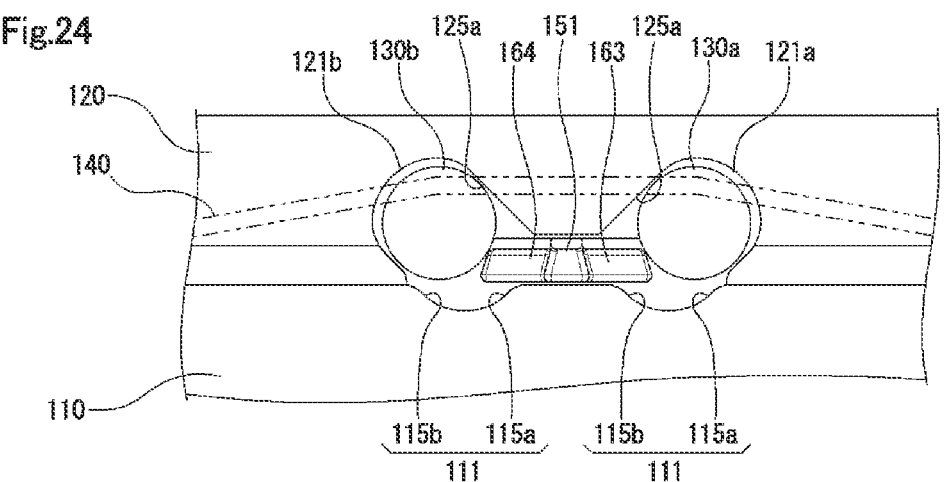
FIG. 24 is a schematic diagram illustrating a standby state of the positive clutch when the operating mode is the two-way free mode.

Namely, when the switching member 150 is axially moved to the front side and fixed in the third fixed position as shown in FIG. 23, the second roller 130b is moved into the second pocket part 121b by the action of the second taper 164 of the roller position changing part 151 against the biasing force exerted by the biasing means 140, and the first roller 130a is moved into the first pocket part 121a by the action of the first taper 162 of the roller position changing part 151 against the biasing force exerted by the biasing means 140, as shown in FIG. 24. Both of the first roller 130a and second roller 130b are thus held in a position separated from the inner race 110.

In this state, the inner race 110 freewheels when rotated, whether in the forward direction or in the reverse direction.

The positive clutch 100 described above also provides the same advantageous effects as the positive clutch 100 described in the first embodiment.

Figure 25:
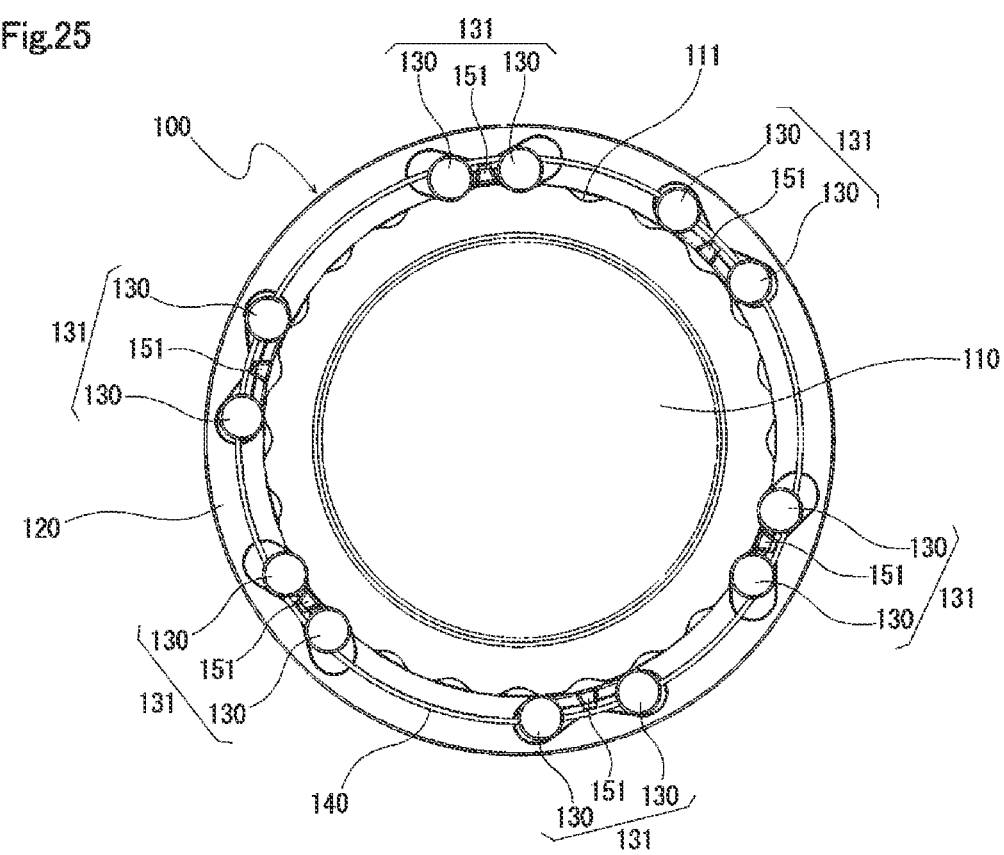
FIG. 25 is a front view illustrating another configuration example of the positive clutch according to the third embodiment of the present invention with some parts omitted.

In the first to third embodiments described above, the plurality of roller pairs 131 are located at the positions matching those of the roller support parts 111 so that all the rollers 130 are supported by the roller support parts 111 of the inner race 110 at the same time. Alternatively, as shown in FIG. 25, some of the plurality of roller pairs 131 may be circumferentially displaced from the roller support parts 111. In the illustrated example, which shows the positive clutch 100 according to the third embodiment, some of the roller pairs 131 are circumferentially displaced from the roller support parts 111 by half a pitch. This arrangement can help reduce backlash and allow for smooth engagement between the inner race and outer race.

In the first to third embodiments described above, the positive clutch is configured to be switchable between four operating modes, i.e., two-way lock mode, forward lock mode, reverse lock mode, and two-way free mode. Alternatively, the clutch may be configured to be switchable between two operating modes, i.e., two-way lock mode and two-way free mode.

Fourth Embodiment

Figure 26A:
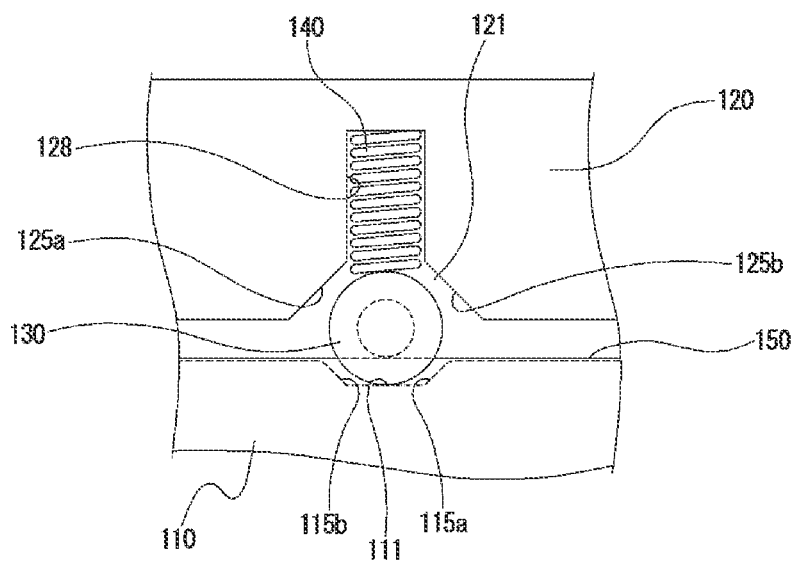
FIG. 26A is a schematic diagram illustrating essential parts in one configuration example of a positive clutch according to a fourth embodiment of the present invention.

FIG. 26A is a schematic diagram illustrating essential parts in one configuration example of the positive clutch according to a fourth embodiment of the present invention. For convenience of explanation, FIG. 26A illustrates the outer circumferential surface of the inner race 110 and the inner circumferential surface of the outer race 120 as parallel flat surfaces. The same applies to FIG. 26B, FIG. 26C, and FIG. 27.

This positive clutch has a plurality of rollers 130 disposed at predetermined circumferential intervals between the coaxial and relatively rotatable inner race 110 and outer race 120.

Roller support parts 111 are arranged at predetermined circumferential intervals on the outer circumferential surface of the inner race 110. A plurality of pocket parts 121 are formed in the inner circumferential surface of the outer race 120, each corresponding to each of the plurality of rollers 130.

The pocket parts 121 increase in opening width from the bottom surface radially inwards, and include a third inclined surface 125a and a fourth inclined surface 125b that are flat and inclined in different directions at an angle smaller than 90° relative to the circumferential direction.

The third inclined surface 125a extends obliquely in one circumferential direction (direction of reverse rotation) radially outwards, and serves as an engagement surface that makes contact with the roller 130 when the clutch is in the lock mode, for example, in which the inner race 110 is stopped from rotating in the forward direction relative to the outer race 120.

The fourth inclined surface 125b extends obliquely in the other circumferential direction (direction of forward rotation) radially outwards, and serves as an engagement surface that makes contact with the roller 130 when the clutch is in the lock mode, for example, in which the inner race 110 is stopped from rotating in the reverse direction relative to the outer race 120.

Each pocket part 121 is formed with a spring accommodating hole 128 that extends continuously from the bottom surface of the pocket part 121.

The biasing means 140 is typically a coil spring, and provided in plurality, each of which is disposed in each of the spring accommodating holes 128 corresponding to each of the plurality of rollers 130 and free to expand and contract.

In the positive clutch according to this embodiment, when the switching member 150 is in the non-operating state, the rollers 130 are maintained in the standby state where they can immediately start engaging with the inner race 110 and outer race 120 upon application of torque on either the inner race 110 or the outer race 120. The operating mode of the positive clutch in this state is therefore the two-way lock mode.

Figure 26B:
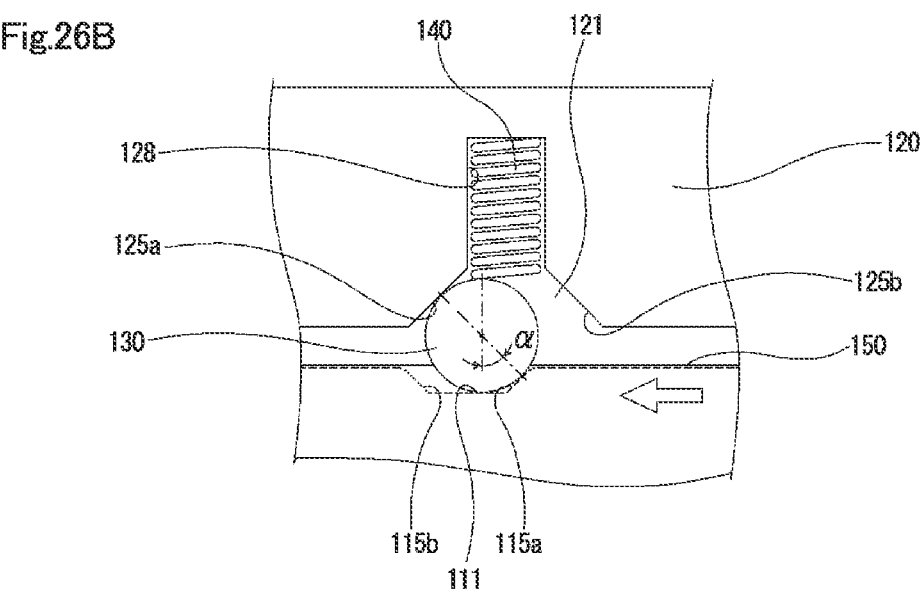
FIG. 26B is a diagram illustrating a state of the positive clutch in the two-way lock mode shown in FIG. 26A when the inner race is rotated in the forward direction.

When the inner race 110 is rotated in the forward direction, the roller 130 is held between the first inclined surface 115a of the roller support part 111 that supports the roller 130, and the third inclined surface 125a of the pocket part 121, in the circumferential direction as shown in FIG. 26B. Thus the inner race 110 engages with the outer race 120.

The roller 130 is held between the first inclined surface 115a and the third inclined surface 125a with the contact angle α being smaller than 90°.

When the inner race 110 is rotated in the reverse direction, the roller 130 is held between the second inclined surface 115b of the roller support part 111 that supports the roller 130, and the fourth inclined surface 125b of the pocket part 121, in the circumferential direction as shown in FIG. 26C. Thus the inner race 110 engages with the outer race 120.

The roller 130 is held between the second inclined surface 115b and the fourth inclined surface 125b with the contact angle α being smaller than 90°.

The operating mode of this positive clutch can be switched to the two-way free mode by rotating the switching member 150 in the forward direction to hold the first roller 130a and second roller 130b separated from the inner race 110.

Namely, when the switching member 150 is rotated in the forward direction and fixed in the operating position, as shown in FIG. 27, the roller 130 is moved into the pocket part 121 by the action of the first cam surface 152a of the roller position changing part of the switching member 150 against the biasing force exerted by the biasing means 140. The roller 130 is thus held in a position separated from the inner race 110.

In this state, the inner race 110 freewheels when rotated, whether in the forward direction or in the reverse direction.

The positive clutch described above also provides the same advantageous effects as the positive clutches 100 described in the first to third embodiments.

While embodiments of the present invention have been described above in detail, the present invention is not limited to the embodiments above and may be carried out with various design changes without departing from the scope of the present invention set forth in the claims.

For example, instead of the configuration in which the outer race is fixed and the inner race is rotated as in the embodiments above, the inner race may be fixed and the outer race may be rotated, or both the inner race and outer race may be rotated.

What is claimed is:

1. A positive clutch comprising:
   an inner race and an outer race that are coaxial and rotatable relative to each other;
   a plurality of rollers disposed between the inner race and the outer race;
   a biasing means for radially biasing each of the rollers;
   roller support parts formed on one of an outer circumferential surface of the inner race and an inner circumferential surface of the outer race to support the rollers, the roller support parts each including an inclined surface portion having a flat inclined surface extending at an angle relative to a circumferential direction; and
   pocket parts adapted to accommodate the rollers and formed on the other one of the outer circumferential surface of the inner race and the inner circumferential surface of the outer race, the pocket parts each including an inclined surface portion having a flat inclined surface extending at an angle relative to the circumferential direction,
   the clutch being configured to stop relative rotation of the outer race and the inner race by holding the rollers between the inclined surface portions of the roller support parts and the inclined surface portions of the pocket parts in the circumferential direction,
   wherein the positive clutch comprises a switching member configured to move at least one of the plurality of rollers to be accommodated in a respective one of the pocket parts against a biasing force of the biasing means,
   the plurality of rollers are provided in pairs and a plurality of roller pairs are arranged circumferentially at a predetermined interval, and
   the pocket parts include a first pocket part and a second pocket part respectively corresponding to one and the other of the pair of rollers,
   the first pocket part extending obliquely in one circumferential direction radially outward, and the second pocket part extending in a different circumferential direction radially outward.

2. The positive clutch according to claim 1, wherein the biasing means is a garter spring.

3. The positive clutch according to claim 1, wherein the roller support parts have an opening edge that is chamfered as viewed in cross section.

4. The positive clutch according to claim 1, wherein the plurality of roller pairs include a roller pair circumferentially displaced from the roller support parts.

* * * * *